US011062608B2

(12) United States Patent
Chase

(10) Patent No.: US 11,062,608 B2
(45) Date of Patent: Jul. 13, 2021

(54) PASSIVE INFRA-RED PEDESTRIAN AND ANIMAL DETECTION AND AVOIDANCE SYSTEM

(71) Applicant: Arnold Chase, West Hartford, CT (US)

(72) Inventor: Arnold Chase, West Hartford, CT (US)

( * ) Notice: Subject to any disclaimer, the term of this patent is extended or adjusted under 35 U.S.C. 154(b) by 0 days.

(21) Appl. No.: 16/673,295

(22) Filed: Nov. 4, 2019

(65) Prior Publication Data

US 2020/0066159 A1 Feb. 27, 2020

Related U.S. Application Data

(63) Continuation-in-part of application No. 16/354,833, filed on Mar. 15, 2019, now Pat. No. 10,467,903.

(Continued)

(51) Int. Cl.
*G08G 1/16* (2006.01)
*G06K 9/00* (2006.01)
(Continued)

(52) U.S. Cl.
CPC ............ *G08G 1/166* (2013.01); *B60Q 1/52* (2013.01); *B60Q 5/005* (2013.01); *B60T 7/22* (2013.01);
(Continued)

(58) Field of Classification Search
CPC ......... A61B 5/0075; A61B 5/01; A61B 5/015; A61B 5/6893; A61B 5/7282; B60R 11/00;
(Continued)

(56) References Cited

U.S. PATENT DOCUMENTS 5,959,572 A * 9/1999 Higashimata .......... G08G 1/166
342/70
6,037,860 A 3/2000 Zander et al.
(Continued)

FOREIGN PATENT DOCUMENTS

| EP | 0640903 A1 | 3/1995 |
| WO | 2014198551 A1 | 12/2014 |
| WO | 2017184061 A1 | 10/2017 |

OTHER PUBLICATIONS

International Search Report for PCT Application No. PCT/US2019/027594 dated May 21, 2019.
(Continued)

*Primary Examiner* — Tyler J Lee
(74) *Attorney, Agent, or Firm* — McCormick, Paulding & Huber PLLC

(57) ABSTRACT

A passive infra-red pedestrian and animal detection and avoidance system and method for augmenting the operation of a vehicle on a roadway, especially for identifying potential pedestrian/vehicular and/or animal/vehicular collision danger for the vehicle in operation and adjusting the position and operation of the vehicle accordingly, includes at least one passive infra-red sensor array mounted on the vehicle in operative communication with an image processor tied into the operational system of the vehicle. The system detects, using thermal imaging and processing, the presence of people or animals that may be in or laterally crossing into the travel lane of the vehicle. The image processor analyzes the detection of a human thermal signature and/or an animal thermal signature, and determines if the detected thermal signature is moving, in what direction and at what speed, to assess any potential threat to the pedestrian, biker or occu- (Continued)

pant of the vehicle, and further whether any responsive action needs to be triggered in the vehicle's operation to avoid a collision.

23 Claims, 7 Drawing Sheets

Related U.S. Application Data

(60) Provisional application No. 62/670,209, filed on May 11, 2018.

(51) Int. Cl.
| | |
|---|---|
| *B60Q 5/00* | (2006.01) |
| *B60Q 1/52* | (2006.01) |
| *B60T 7/22* | (2006.01) |
| *G06K 9/20* | (2006.01) |
| *H04L 29/08* | (2006.01) |
| *G05D 1/00* | (2006.01) |

(52) U.S. Cl.
CPC ..... *G06K 9/00798* (2013.01); *G06K 9/00805* (2013.01); *G06K 9/2018* (2013.01); *B60T 2210/32* (2013.01); *B60T 2250/00* (2013.01); *B60T 2250/04* (2013.01); *G05D 1/0088* (2013.01); *G05D 2201/0213* (2013.01); *H04L 67/12* (2013.01)

(58) Field of Classification Search
CPC .......... G01J 2005/0077; G01J 5/0003; G01J 5/0025; G06K 9/00362; G06T 1/0007; B60W 2420/00; G05D 1/0088
See application file for complete search history.

(56) References Cited

U.S. PATENT DOCUMENTS

| | | | |
|---|---|---|---|
| 6,151,539 A | 11/2000 | Bergholz | |
| 6,327,522 B1 | 12/2001 | Kojima et al. | |
| 6,759,949 B2 | 7/2004 | Miyahara | |
| 7,567,687 B2 | 7/2009 | Kudo | |
| 8,049,609 B2 | 11/2011 | Takahashi et al. | |
| 8,981,966 B2 | 3/2015 | Stein et al. | |
| 8,988,525 B2 | 3/2015 | Thompson et al. | |
| 9,128,290 B2 | 9/2015 | Kim | |
| 9,230,178 B2 | 1/2016 | Toyofuku | |
| 10,175,112 B1 | 1/2019 | Kuperman et al. | |
| 2005/0084659 A1 | 4/2005 | Dunkel | |
| 2008/0291276 A1 | 11/2008 | Randler | |
| 2008/0297374 A1 | 12/2008 | Usami | |
| 2010/0005044 A1 | 1/2010 | Bowring et al. | |
| 2012/0038778 A1 | 2/2012 | Klager et al. | |
| 2012/0229643 A1 | 9/2012 | Chidanand et al. | |
| 2012/0326917 A1* | 12/2012 | Kiehne | B60T 7/22 342/71 |
| 2013/0138371 A1 | 5/2013 | Kennedy et al. | |
| 2013/0194127 A1* | 8/2013 | Ishihara | H01Q 1/3283 342/70 |
| 2013/0211720 A1 | 8/2013 | Niemz | |
| 2013/0235202 A1 | 9/2013 | Nagaoka et al. | |
| 2015/0019098 A1 | 1/2015 | Schrabler et al. | |
| 2015/0035962 A1 | 2/2015 | Nagaoka et al. | |
| 2015/0123816 A1 | 5/2015 | Breed | |
| 2015/0161796 A1 | 6/2015 | Choi et al. | |
| 2016/0152232 A1 | 6/2016 | Takahashi et al. | |
| 2016/0180175 A1 | 6/2016 | Bitton et al. | |
| 2017/0004365 A1 | 1/2017 | Ono et al. | |
| 2017/0028811 A1 | 2/2017 | Jayasundera et al. | |
| 2017/0197617 A1 | 7/2017 | Penilla et al. | |
| 2017/0219240 A1 | 8/2017 | Cassini et al. | |
| 2017/0349173 A1 | 12/2017 | Nishiguchi et al. | |
| 2017/0371336 A1 | 12/2017 | Mei et al. | |
| 2018/0011485 A1 | 1/2018 | Ferren | |
| 2018/0029610 A1 | 2/2018 | McNew | |
| 2018/0134281 A1 | 5/2018 | Newman et al. | |
| 2018/0158335 A1 | 6/2018 | Gee et al. | |
| 2018/0204074 A1 | 7/2018 | Kumano et al. | |
| 2018/0234643 A1 | 8/2018 | Kobayashi | |
| 2018/0236985 A1 | 8/2018 | Kim et al. | |
| 2018/0236986 A1 | 8/2018 | Kim et al. | |
| 2019/0061753 A1 | 2/2019 | Tanaka | |
| 2019/0193787 A1 | 6/2019 | Matsumoto | |
| 2020/0019792 A1 | 1/2020 | Sano et al. | |

OTHER PUBLICATIONS

International Search Report for PCT Application No. PCT/US2019/027589 dated Jun. 21, 2019.

\* cited by examiner

PASSIVE INFRA-RED PEDESTRIAN AND ANIMAL DETECTION AND AVOIDANCE SYSTEM

CROSS-REFERENCE TO RELATED APPLICATIONS

This application is a continuation-in-part application of U.S. patent application Ser. No. 16/354,833, filed Mar. 15, 2019, which claims the benefit of U.S. Provisional Application No. 62/670,209, filed May 11, 2018, each of which is hereby incorporated by reference in its entirety.

FIELD OF THE INVENTION

The present invention generally relates to augmenting the operation of autonomous vehicles, as well as manually-driven vehicles, and more particularly relates to a system and method for identifying situations that pose potential dangers to pedestrians from vehicles in operation, specifically between the vehicle(s) and pedestrian traffic, and for adjusting the position and operation of the vehicle accordingly to prevent harmful interaction between the vehicle and pedestrians, as well as warning pedestrians and bikers of an impending collision. The present invention further relates to a system and method for identifying potential dangers to vehicle occupants from animals in a roadway or determined to be probable for entering a pathway of the vehicle.

BACKGROUND OF THE INVENTION

Many companies are developing autonomous vehicles for commercial and personal use on existing roadways for a variety of applications, including but not limited to personal taxi services, delivery services, and the like. In accordance with the present invention, an autonomous vehicle is a vehicle capable of operating without a human driver. Such vehicles can be designed to operate utilizing an onboard computer and a system of sensors designed to drive, steer, brake, and otherwise operate the vehicle in the same manner as if there were a human operator. It is envisioned that fleets of autonomous vehicles will soon be available, similar to a network of taxis, buses or delivery vans, whereby a user can request an autonomous vehicle to pick-up, transport and drop off passengers, or pick-up, transport, and deliver packages or the like, on demand. Alternatively, users can own an autonomous vehicle for personal use and use it for ordinary tasks, such as commuting to work, running errands, dropping the kids off at school, for travel, or the like.

Current autonomous vehicles in the development and testing stages generally utilize multiple systems to fully operate the vehicle without a human operator. First, a standard GPS system is used to plan a route for the vehicle. Taking into account the starting point and the destination for a trip, as well as other factors such as traffic conditions, road closures, weather conditions, preferred routes, toll roads, etc., the GPS system determines the best route for the vehicle to take. However, for safe and efficient operation, autonomous vehicles also need a system to recognize dynamic conditions along the route during operation of the vehicle. Such a system may be referred to as an augmented GPS system, which utilizes an array of technologies, such as cameras, sensors, radar, LIDAR and lasers to provide a three-dimensional view around the vehicle during operation. Such a system can generally keep track of other cars around the vehicle; detect obstacles or hazards around the car, in the road up ahead, or approaching the car from the front, rear, or sides; and determine the location of the edge of the road or travel lane, upcoming turns, hills or descents, and assess general road conditions ahead, behind and around the vehicle.

Autonomous vehicles also require a centralized system within the car to process the information provided from the GPS system and augmented GPS system and utilize the processed information to operate the vehicle. Such commonly utilized systems generally include a Computer Area Network (CAN) bus in the vehicle to communicate with and coordinate operation of the GPS system, augmented GPS system and other autonomous vehicle operating systems.

Non-autonomous vehicles also utilize similar technology to back-up a human driver. For example, cars have used various forms of cruise control for decades. More recently, cars have been equipped with systems that will autonomously parallel park the car. Many modern cars are now equipped with systems that assist the driver when the car begins to drift out of its lane on the highway, or brake the car if it is getting too close to the car in front of it, or alert the driver if there is an object in the road ahead.

Until guidance systems on-board autonomous vehicles match or exceed the perception and analytical decision-making ability of human drivers, there will be numerous ongoing daily situations which will frustrate the ability of a full autonomous vehicle to properly and dynamically respond to, or react to, its surroundings. Moreover, until autonomous vehicles can safely rely upon existing operational systems and sensors for safe and efficient operation and eliminate essentially all risks, the public will continue to be hesitant to put full faith in true autonomous operation of such vehicles. Indeed, "real-world" autonomous vehicular tests have shown to have had numerous guidance failures, accidents, etc., caused by vehicles, pedestrians, or bikers laterally crossing into a travel lane that existing guidance systems and sensors have either failed to adequately detect, recognize and/or react to these situations in a timely fashion, or have had a high rate of "false" indications. Even with a plethora of guidance systems and sensors in both autonomous and driven-vehicles, there have been failures to identify and avoid interaction with pedestrian and/or biker traffic for various reasons.

While various optically-based automotive and/or autonomous guidance systems and sensors (e.g., video, LIDAR, etc.) are capable of performing well under ideal visual conditions, their capabilities can diminish to unusable levels under adverse ambient conditions, such as during or shortly after rain, snowfall, fog, etc., or when it is dark outside and in low-lighted areas of the roadway, or even when the pedestrian blends into the surroundings based upon clothing, skin tone, weather, sun glare, etc. Additionally, while the existing level of "on-board" sensors, cameras, devices, and interfaces can alter an autonomous vehicle's driving characteristics to a limited degree (e.g., by braking for unexpected obstacles and/or other vehicles, or steering a vehicle if it drifts out of its lane), there is currently an inherent extreme deficiency with specifically assisting autonomous vehicles in the identification of pedestrian traffic and furthermore determining when said pedestrian traffic is poised to negatively interact with a vehicle, and further assist such vehicles in automatically taking action to prevent such negative interactions. Accordingly, there is a need to improve upon existing optically-based guidance systems and sensors to ensure that operation of an autonomous vehicle is safe and efficient in all conditions.

It has further proven most daunting to operate a vehicle autonomously under any and all conditions due to the inherent difficulties of requiring a vehicle to make real-time decisions in view of unusual, unexpected or unpredicted situations. Even under ideal ambient conditions, the CAN bus of the vehicle must coordinate a considerable number of sensors, and requires extensive analytical processing power to merely allow the vehicle to try to identify what expected and/or unusual or unexpected objects are during operation, with very little time to actually detect, recognize and react appropriately. Since a primary object of the present invention is to first detect a "human", traditional optical means typically fail as there are an infinite number of visible representations of a "human" that could not all possibly reside in an on-board database. An example of this would be a video processor trying to identify a "human" amongst so many variations such as: a human propelling themselves in a wheelchair versus a human in a wheelchair being pushed by another human versus a human viewed in profile standing next to a bicycle versus a human in profile wearing a backpack, etc. Further, even if the vehicle is able to identify an object or situation, there is still a challenge with having the vehicle then attempt to figure out what the correct procedural response should be. As there are almost an infinite number of potential scenarios which require an appropriate response by the autonomous vehicle, this again proves to be exceedingly difficult, if not impossible, given the limitations of having a constrained amount of on-board processing power and database size in the vehicle, as well as little real time available for a response. Given that there are so many unknown or unpredicted situations, a better approach to autonomous vehicle guidance is still needed, and the best place to start is improving the speed, efficiency, and efficacy with which a vehicle is able to detect and identify an unknown, unexpected and unpredicted situation and a need for guidance adjustment.

Accordingly, there is a need for an improved system for the operation of an autonomous vehicle for identifying unknown, unexpected and unpredicted situations or conditions on a roadway that overcomes the drawbacks and limitations of existing dynamic guidance systems. Further, there is a need for a system that utilizes infra-red imaging sensors designed for specific "human" detection and analysis that can assist in the safe and efficient operation of vehicles in response to unknown, unexpected and unpredicted situations involving humans, whether they be pedestrians, runners, bikers, or any situation which causes them to impinge onto a roadway and into the predicted pathway of moving vehicles in conflict with vehicular traffic.

SUMMARY OF THE INVENTION

The present invention is generally directed to a passive infra-red based pedestrian detection and avoidance system for augmenting the operation of autonomous or driven vehicles on a roadway. In accordance with embodiments of the present invention, the system provides a superior approach to assist a vehicle or driver in detecting and identifying potential interactions between a moving vehicle, such as a vehicle travelling on a roadway along a predicted pathway, and pedestrian or biker traffic.

Central to the operation of the system in accordance with the present invention is the use of at least one forward-looking passive infra-red (IR) image sensor mounted on a vehicle that is in operative communication with an image processor tied into the operational system of the vehicle, such as via a central CAN Bus unit in constant communication with various vehicle sensors, such as the forward-looking IR sensor, for analysis and output processing, preferably immediately in real-time. In operation, the system in accordance with the present invention provides an autonomous or driven vehicle with means for instantly detecting specifically-selected and filtered thermal wavelengths that are characteristic of people, whether they are walking, running, or biking, who are already in, or are laterally crossing, or are about to enter into a travel lane, and instantly responding to this intrusion. The image processor searches for and analyzes the detection of a thermal signature indicative of a human and determines if the detected human thermal signature is moving, in what direction and at what speed, to assess any current or upcoming threat to the vehicle or the pedestrian, and further whether any responsive action needs to be triggered in the vehicle's operation to avoid an interaction between the two. The system is also capable of determining if a vehicle is headed towards a stationary human already in a travel lane. This information may be used to provide, for instance, a "heads up" or other positional, graphical, or warning display on the windshield of a driven vehicle, or as a data input to the operating and/or navigation system of an autonomous vehicle. Though preferably used in autonomous vehicles, the system of the present invention can be used in human-operated vehicles as an alert and/or adjunct automatic system to assist the driver.

In an embodiment of the present invention, a method for identifying potential laterally moving humans, as well as identifying humans already existing in a travel lane, to benefit the operation of a moving vehicle and adjust the operation of the vehicle accordingly comprises detecting a human thermal signature on the side of, or in, a roadway using thermal imaging, such as via an infra-red sensor array mounted to the vehicle, and determining if any detected human thermal signature(s) is in a position, or moving in a direction that, based on the direction and speed of both the vehicle and the pedestrian, would cause an interception accident. The method further comprises assessing the need for responsive action in the vehicle's operation, and triggering responsive action in the vehicle's operation if a need for such action is identified.

In another embodiment of the present invention, a system for identifying laterally moving human dangers for a moving vehicle and adjusting operation of the vehicle accordingly comprises a thermal imaging sensor assembly for detecting a human thermal signature on the side of the roadway using thermal imaging. The system further comprises an image processor in operative communication with the thermal imaging sensor assembly for determining if the human thermal signature is moving in a direction toward the roadway and assessing the need for responsive action in the vehicle's operation. The system further comprises a central vehicle control system in operative communication with the image processor for triggering responsive action in the vehicle's operation if a need for such action is identified.

In accordance with the present invention, said vehicle response can take the form of providing direct input to a vehicle's "Driver Assist" steering system and/or automatic activation of a vehicle's braking system. The system is designed to be an adjunct to other sensors and guidance systems on a vehicle, especially during times of challenging ambient conditions, and as such enhances an autonomous vehicle's autonomous guidance system.

The system in accordance with the present invention is capable of working with both driven, as well as autonomous vehicles.

As noted, the image processor can also be used to detect the presence of humans on the side of the road, and more importantly, when such humans are approaching the road from the side. More preferably, the image processor using the system in accordance with the present invention, can determine if a detected object on the side of the road is moving, in what direction, and at what speed, and adjust operation of the vehicle accordingly.

The present disclosure further relates to a system for identifying an animal danger between a moving vehicle and an animal, and for adjusting operation of the vehicle accordingly. The system includes a thermal sensor array assembly for detecting an animal thermal signature generated by an animal on the side of the roadway or within a predicted pathway of the vehicle on the roadway using passive thermal emission detection, an image processor in operative communication with the thermal sensor array assembly for determining if the animal thermal signature is within or moving in a direction toward the predicted pathway of the vehicle and assessing the need for responsive action in the vehicle's operation, and a central vehicle control system in operative communication with the image process for triggering responsive action in the vehicle's operation if a need for such action is identified.

According to the present disclosure a method for identifying and preventing animal dangers between a moving vehicle and an animal, and for adjusting operation of the vehicle accordingly is disclosed. The method includes detecting a thermal signature generated by an animal on the side or within the traveled portion of a roadway using passive thermal emission detection, determining if the animal thermal signature is within or moving in a direction toward a predicted pathway of the vehicle, assessing the need for responsive action in the vehicle's operation, and triggering responsive action in the vehicle's operation if a need for such action is identified.

Objects, features and advantages of the present invention will become apparent in light of the description of embodiments and features thereof, as enhanced by the accompanying figures.

DETAILED DESCRIPTION OF EMBODIMENTS OF THE INVENTION

Figure 1:
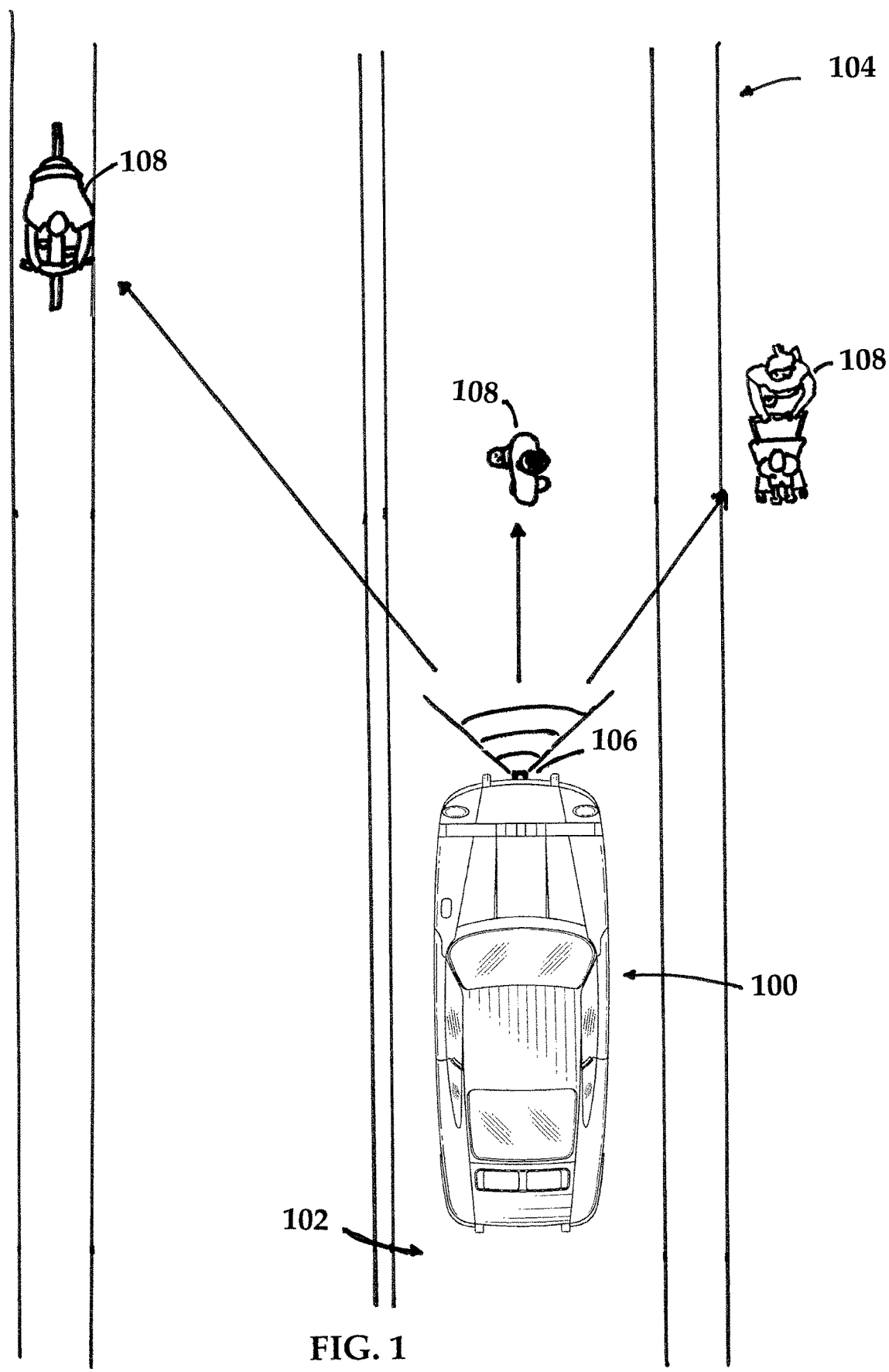
FIG. 1 provides an illustration of a vehicle on a roadway using the system in accordance with the present invention to detect direct or lateral human threats to the vehicle.
Figure 2:
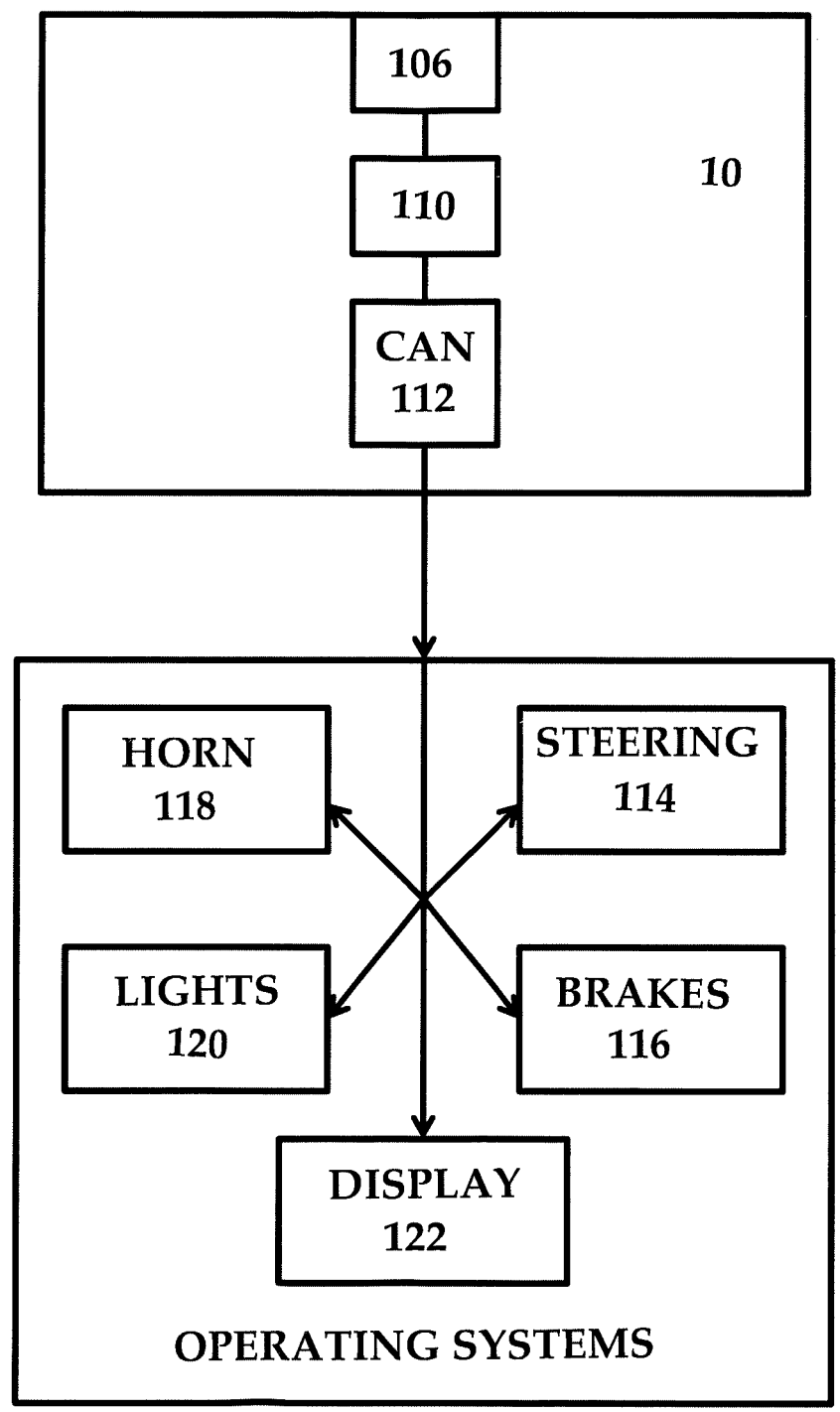
FIG. 2 provides a schematic of a first embodiment of a passive infra-red pedestrian avoidance system in accordance with the present invention.

Referring to FIGS. 1-2, a first operational mode of a passive infra-red pedestrian avoidance system in accordance with the present invention is illustrated. As illustrated in FIG. 1, a vehicle 100 generally travels within a travel lane 102 on a roadway 104. The system, generally designated by reference numeral 10, comprises at least one forward-looking passive IR image sensor or sensor array, generally designated as reference numeral 106, mounted on the vehicle 100 and directed outwardly in front of the vehicle 100, as the vehicle 100 moves, so that the IR sensor(s) 106 can detect any stationary or moving object(s) 108 containing a human thermal profile in the vehicle's travel lane 102, or in the process of heading towards the vehicle's predicted pathway.

In preferred embodiments of the present invention, as generally illustrated in FIG. 1, a single, forward-looking IR sensor 106 is mounted on the vehicle 100, preferably on the front of the vehicle 100, and more preferably centered on the front of the vehicle 100 so that it can detect moving objects 108 relative to both sides of the vehicle 100 on the left and right edges of the roadway 104 ahead of the vehicle 100, as well as any object 108 moving or stationary, already in the vehicle's path. Such a forward-looking IR sensor 106 could dynamically vary the number and area of sensor pixels analyzed depending on a vehicle's forward speed. At higher speeds, an image processor 110 associated with the IR sensor 106 could prioritize the central region of the sensor 106, but as the vehicle's speed decreases, the number and area of pixels analyzed can be increased to effectively widen the sensor's field area(s) of interest. At low speeds, the area of analysis would generally cover a relatively close range in front of the vehicle 100—about 10 to 20 feet in front of the vehicle 100 effectively representing a range from the IR sensor 106 of approximately ±45 degrees from the centerline of the vehicle 100, so as to be able to image the left and right sides of the roadway 104 or travel lane 102 ahead of the moving vehicle 100. Optimally, each IR sensor 106 has a relatively large pixel array in order to effectuate dynamic fields of reference, for example, at least 640×480, from which laterally moving objects can be discerned in accordance with the present invention. The number and area of sensor pixels for the thermal acceptance window can also be dynamically varied depending on ambient temperature or weather conditions, roadway conditions, or movement of the object relative to the vehicle.

Figure 5:
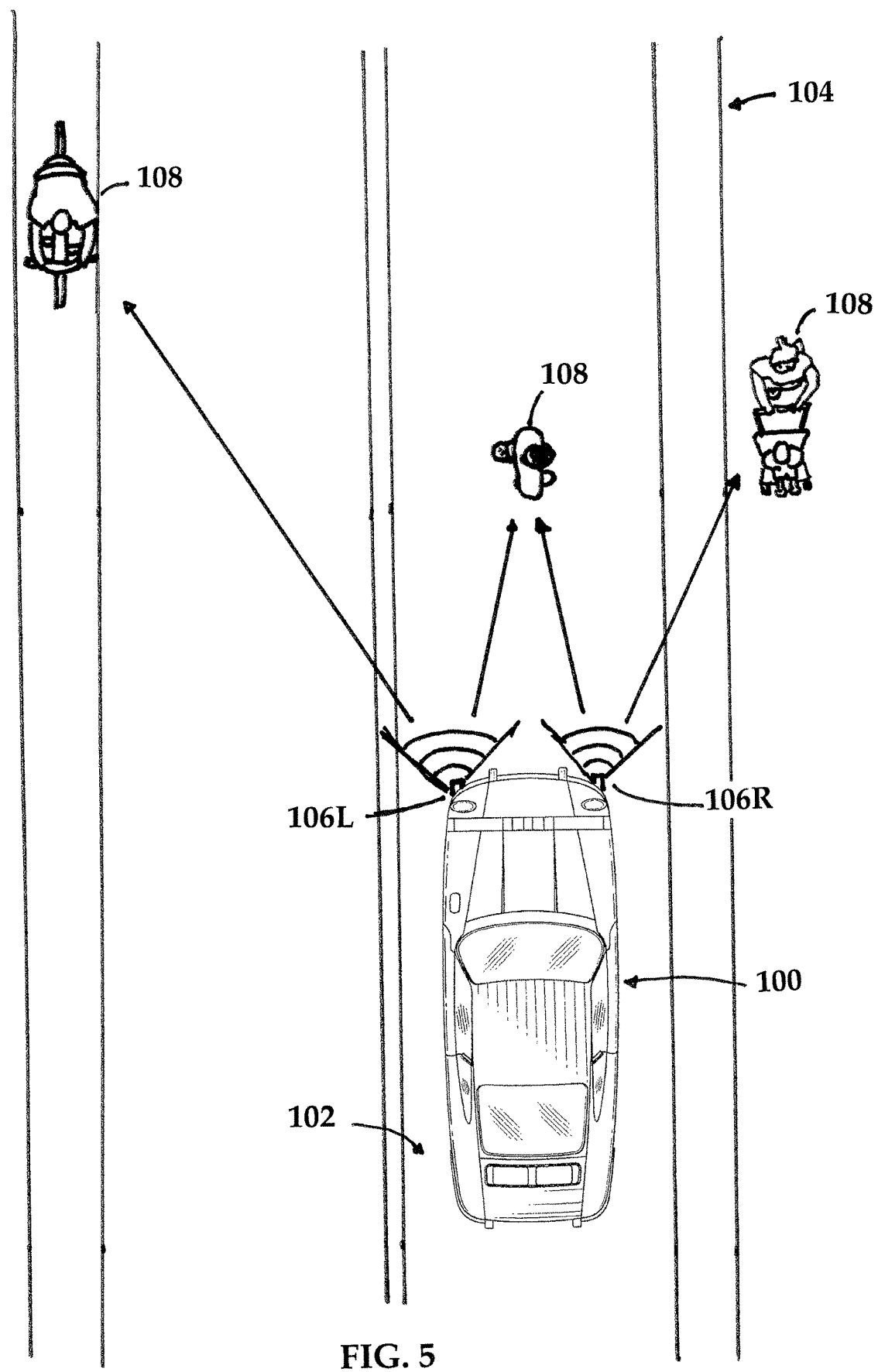
FIG. 5 provides an illustration of a vehicle on a roadway using the system in accordance with an alternate embodiment of the present invention to detect lateral threats to the vehicle.
Figure 6:
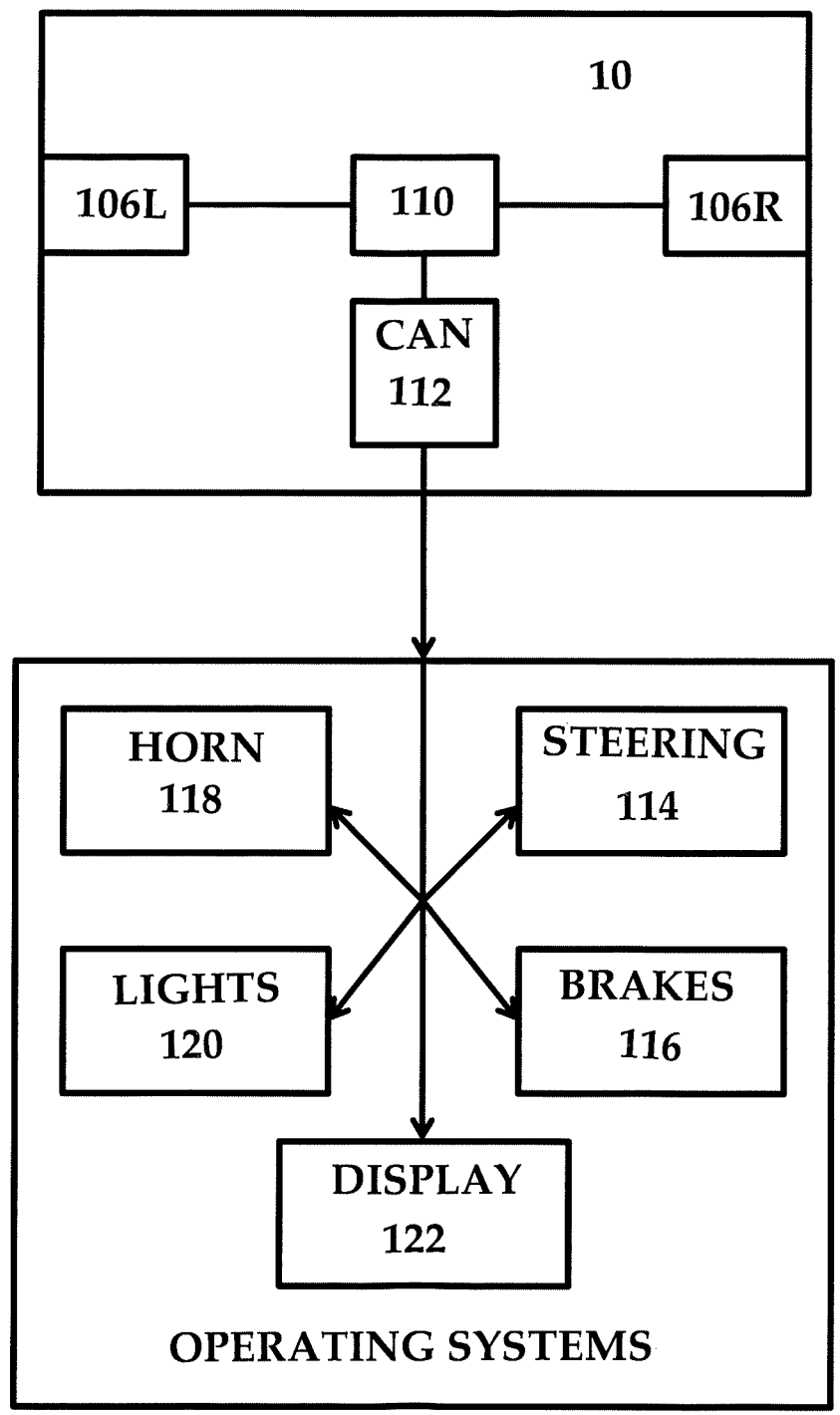
FIG. 6 provides a schematic of a second embodiment of a passive infra-red pedestrian avoidance system in accordance with the present invention.

In alternate set-ups of the thermal imaging sensor assembly provided on the vehicle 100, multiple forward-looking IR sensors 106 can be mounted to the vehicle 100, preferably on the front end thereof. Such IR sensors 106 can functionally operate in an independent, over-lapping and/or redundant fashion with each other. In an embodiment of the present invention as illustrated in FIGS. 5-6, the vehicle 100 may include a dedicated right-side IR sensor 106R—directed toward the right edge of the roadway/travel lane ahead of the vehicle 100 in a forward-looking manner—and a dedicated left-side IR sensor 106L—directed toward the left edge of the roadway/travel lane ahead of the vehicle 100 in a forward-looking manner. In such an embodiment, the sensors 106R and 106L may be positioned on the front end of the vehicle 100, or alternately, on the lateral sides of the vehicle 100, but directed forwardly from the vehicle 100 so as to detect objects ahead of the moving vehicle 100. More preferably, the sensors 106R and 106L can be directed to be able to detect upcoming objects 108 (e.g., pedestrians and cyclist, as illustrated) on the lateral side of the vehicle 100 in a predictive fashion while also accommodating the movement and speed of the vehicle 100, and further taking into account possible or likely responsive actions the vehicle 100 can take upon detection of a laterally moving threat.

In yet another embodiment, the vehicle 100 can be provided with a combination of front and side IR sensors 106, each still preferably forward-looking, to optimize the detection areas of the system. Again, such IR sensors 106 can functionally operate in an independent, over-lapping and/or redundant fashion with one another. The use of multiple IR sensors 106 can also assist in compensating for variable vehicle speed and ensure that actual and potential threats are quickly identified regardless of the speed of the vehicle 100, the speed of the object 108, the ambient lighting conditions, roadway conditions, or weather conditions.

The discussion of IR sensors and IR sensor array in regards to the present invention are intended to be interchangeable, and each embodiment in accordance with the present invention covers scenarios using a single sensor as well as an array or set of sensors operating to a collective end of monitoring the lateral sides of the roadway/travel lane ahead of the moving vehicle 100 for potential threats to the vehicle 100, such as pedestrians walking in front of the vehicle 100.

Referring to the schematic illustrated in FIG. 2, the IR sensors 106 are in operative communication with an image processor 110, such as a video processor, tied into the operational system of the vehicle 100, such as via a central CAN Bus unit 112. Preferably, the CAN Bus 112 is in constant communication with various vehicle sensors, such as the IR sensors 106, for analysis and output processing, preferably immediately in real-time, based on the detected data. The image processor 110 filters out any object that is outside a narrow or predefined thermal acceptance window indicative of a normal human thermal profile (e.g., about 98.6° Fahrenheit) before analyzing whether any thermally detected objects are in or are about to enter the roadway 104. The acceptance window can be dynamically widened or narrowed, and/or the thermal center point shifted in accordance with ambient temperature or weather conditions, roadway conditions, lighting conditions, vehicular speed, etc.

In operation, a method for identifying laterally moving dangers for a moving vehicle 100 and adjusting operation of the vehicle 100 accordingly comprises first detecting an object 108, associated with a human thermal signature, on the side of, on a path towards, or already within the roadway 104 along a predicted pathway of the vehicle 100, using thermal imaging (e.g., the IR sensors 106 and the image processor 110). Upon detection and subsequent selection of qualifying objects 108, or potential "threats", the system 10 first determines how many qualified pixels meet the target criteria, as dynamically modified by the vehicle's forward travelling speed. The rate of target pixel change, relative to the vehicle's forward travelling speed, determines how close the vehicle 100 is to a potential object 108. The system 10 then determines if the object 108 is already in the roadway travel lane(s) 102, or moving in a direction toward the roadway travel lane(s) 102, and at what speed, and assesses the need for responsive action in the vehicle's operation.

While the system 10 normally tracks movement of an object 108 relative to the vehicle 100 that has already met the human thermal characteristics, the image processor 110 is also capable of operating in an alternate mode whereby if the qualified object 108 is not moving relative to the vehicle 100, but the vehicle 100 is heading directly toward a stationary qualified object 108, the image processor 110 will count the number of contiguous pixels in a grouping that have met the human thermal profile criteria ("qualified pixels") and consider that increasing numbers of qualified pixels as movement towards a qualified object 108. The numeric threshold of said qualified pixels that are needed to trigger any responsive action(s) may be dynamically changed by the image processor 110 in response to the vehicle's speed and/or the location of the qualified pixels on the sensor array.

If responsive action is identified as being needed, the system 10 triggers such responsive action in the vehicle's operation, such as by providing adjustment input to the vehicle's steering system 114; activating the vehicle's braking system 116; sounding an audible alert 118 associated with the vehicle 100, such as activating the vehicle's horn; and/or activating a visual alert 120 associated with the vehicle 100, such as flashing the vehicle's headlights. For manually driven vehicles 100, additional interior audible alerts, haptic feedback, and/or alerts displayed in front of the driver on the windshield could also be provided.

The step of determining if the human thermal signature is moving in a direction potentially converging with the vehicle 100, for example, with the vehicle's predicted pathway based on direction and speed of the vehicle 100, can involve first, determining if the human thermal signature is moving or stationary upon initial detection thereof; then, determining, if moving, whether the direction of the human thermal signature is generally perpendicular to the roadway 104; and then, determining if the movement is toward the roadway travel lane 102. The step of assessing whether there is a need for responsive action includes determining the speed and direction of movement of the target 108 and/or by determining if the target 108 is within close range of, or already in, the vehicle's predicted pathway. For example, the system 10 can note an increasing number of contiguous qualified thermal pixels reaching a numerical threshold, indicating a proximity reactive threshold. In this regard, other factors can be analyzed, such as ambient temperature, weather conditions, road conditions, vehicle speed, and the like, to modify the reactive algorithm threshold, as described in more detail below.

While generally described herein for use in connection with autonomous—or driverless—vehicles, the system 10 of the present invention can also be used in driven vehicles, either having a quasi-autonomous mode or as a back-up redundancy to the human operator. For example, the detected human thermal signature information and suggested corrective action may be provided, for instance, as a "heads up" or overlaid display outline 122 on a driven vehicle 100, or as a data input to the navigation and automatic braking systems 114 and 116, respectively, of the vehicle 100. The driver may be able to adjust the vehicle's position and speed manually, or in the alternative, the vehicle 100 may automatically adjust the vehicle's position, speed, and braking based on such continuous monitoring of any laterally moving threats to the vehicle's operation. If the system 10 detects reactive driver input(s), it can then focus on warning the detected target(s) through the audible and visual signaling systems 118 and 120, respectively, while a driver is focusing on the overall vehicle control.

As noted, the image processor 110 can also be used to detect the presence of human thermal profiles on the side of the roadway 104, and more importantly, when such humans traverse onto the roadway 104 itself. More preferably, the image processor 110 using the system 10 in accordance with the present invention, can not only detect the presence of a target object 108 on the side of the roadway/travel lane using thermal imaging, but also determine if the object 108 is moving, in what direction, and at what speed, and adjust operation of the vehicle 100 accordingly. In determining if responsive actions are needed for safe operation of the vehicle 100, as well as what responsive actions are available, the system 10 can predict if a detected human thermal signature is likely to be struck by the vehicle 100 by also taking into account the speed and location of the vehicle 100 relative to the detected human thermal signature; the location of the vehicle 100 on the roadway 104 (e.g., outer lane or inner lane on a multi-lane roadway); the location of the vehicle 100 within a particular travel lane 102; and ambient weather conditions that would potentially impact reaction times for the system and the level of braking force, mindful of distances required to react to a situation properly.

Figure 3:
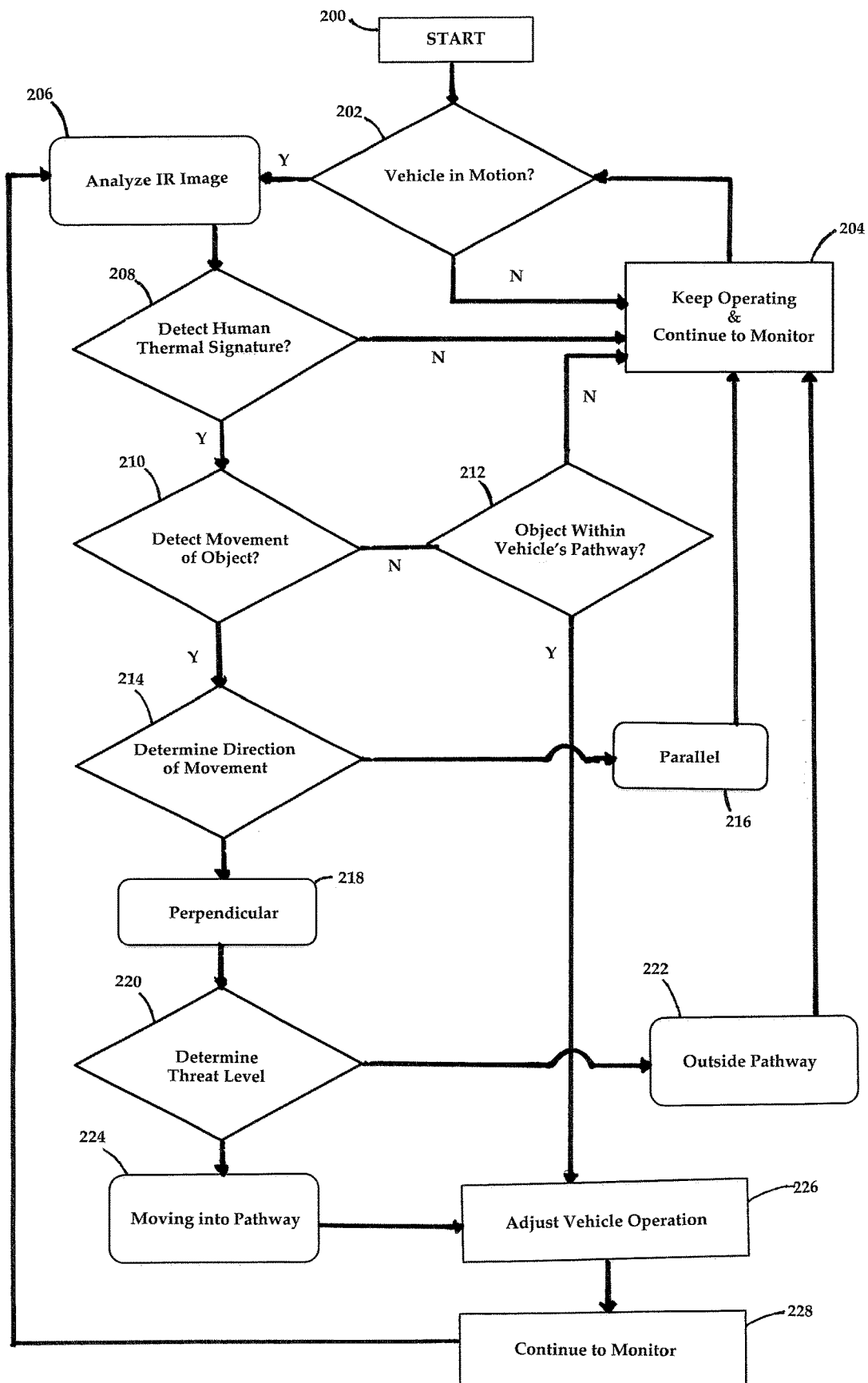
FIG. 3 provides a flowchart generally illustrating an embodiment of a lateral threat detection method in accordance with the present invention.

In accordance with the present invention, a simultaneous analysis mode, as illustrated in FIG. 3, is available for an autonomous vehicle 100. In operation, the system 10 uses a proprietary algorithm to initially detect the location of objects 108 possessing a human thermal signature (e.g., pedestrians, bystanders, bikers, wheelchairs with human occupants), namely, objects exhibiting a thermal signature that is plus/minus the "nominal" human body temperature of 98.6° Fahrenheit. The algorithm then determines if the detected human thermal signature in said thermal range is already located in, or is moving within, or towards the vehicle's travel area (which would be indicative of a pedestrian or biker), or is maintaining travel in a safe manner within designated bicycle lanes, or at the side of the road for instance. If both the temperature and conflicting movement criteria are simultaneously met, then a logic circuit output will automatically trigger a responsive action in an autonomous vehicle 100, such as activating a vehicle's braking system 116 and/or biasing the steering control system 114 to redirect the vehicle 100 away from the impinging or potentially impinging object 108. Additionally, upon mode activation, the system 10 may activate the vehicle's horn 118 and lights 120 in a distinctive manner to visually and aurally alert and warn distracted pedestrians (such as those looking down at their mobile devices), visually impaired pedestrians, and children running after an object in the roadway, etc. A further implementation of the system 10 would also transmit a warning signal via Bluetooth, V2P, or other signaling means to area mobile devices that are so equipped to receive such safety signals.

In operation, the image processor 110 is specifically looking for and determining whether there is either perpendicular or diagonal movement of human thermal signatures that are about to and/or are in the process of impinging on the upcoming roadway surface of a moving vehicle 100, or stationary human thermal signatures that are existing within the roadway 104 or travel lane 102, while concurrently ignoring strictly parallel "body temperature" movement such as would be typical of bikers or pedestrians walking or biking with traffic along sidewalks or roadway edges or shoulders. These parallel movement(s), unless already located in, or potentially heading into a travel lane or area of pedestrian/vehicle conflict, would lock-out the image processor's output to the vehicle's steering and braking systems so as to avoid untimely or premature triggering of the braking system 116, or untimely or premature steering adjustments by the steering system 114. Detection of thermal objects outside of human thermal signatures would generally be ignored, as these objects would be flagged by other detection systems, such as LIDAR or proximity sensors, which would trigger an appropriate response from those systems based on criteria other than a human thermal profile.

Referring to FIG. 3, an IR lateral detection process using the system 10 in accordance with the present invention is illustrated. In preferred embodiments, the system 10 only turns on and operates when the vehicle 100 is turned on, and even more preferably when the vehicle 100 is moving. At Block 200, the vehicle 100 is turned on and the system 10 is activated, preferably in connection with the vehicle's ignition. At Block 202, the system 10 queries the vehicle's operating systems to determine whether the vehicle 100 is moving or not. If not, then the system 10 continues to query about movement on a loop until there is actual vehicle movement, as represented in Block 204. Once the system 10 is informed that the vehicle 100 is moving, the outputs(s) of the IR sensors 106 and motion algorithms, which are already active and searching for and/or detecting qualified targets 108, are analyzed and allowed at Block 206 to pass along the information to the vehicle's operational systems. As noted above, the vehicle 100 can include a single IR sensor 106 positioned on the front-center of the vehicle 100 for detecting objects 108 ahead that may be approaching the vehicle's path from straight ahead, as well as from both lateral sides of the vehicle 100, or in conjunction with two IR sensors 106R and 106L positioned on respective sides of the vehicle 100 for respectively monitoring both sides of the roadway 104 ahead of the moving vehicle 100 to detect objects 108.

If thermal signatures are detected, then the system 10 further determines at Block 208 if the detected thermal object(s) is characteristic of a human thermal profile by passing through a dynamic qualifying thermal gate that is nominally centered around 98.6° F. If not, then the system 10 ignores the object and continues to search for and qualify other detected thermal signatures, again at Block 204. If the object 108 is, however, within the pre-determined human thermal range, it is then classified as a valid detected human thermal signature, and the system 10 then subsequently determines if said human thermal signature is moving, as indicated at Block 210. If no movement is detected, and the object 108 is outside of the travel lane 102 or the vehicle's pathway (Block 212), then the system 10 continues to monitor this and other human thermal signature targets for changes in their movement status without informing the vehicle 100 to take operative action (Block 204). If no movement is detected, and the object 108 is within the travel lane 102, then the system 10 informs the vehicle 100 to take operative action such as holding its present position or adjusting vehicle operation, as necessary (Block 226). If no movement is detected, and the object 108 is safely adjacent to, or within the edges or shoulder of the travel lane 102, then the system takes no operative action. If movement is subsequently detected, then the system 10 determines the direction of the movement at Block 214—e.g., is the movement of the human thermal signature parallel with the vehicle's present and predicted travel, moving away from the vehicle's travel path, or moving towards the vehicle's predicted travel path? In this regard, the system 10 first determines if the movement is parallel to the vehicle 100 at Block 216 (indicating, for example, a person walking or biking within a dedicated lane on the side of the road). If such movement is parallel, then the system 10 determines that the human thermal signature is not in immediate danger from the travel pathway of the vehicle 100 and returns to monitoring this and other thermal signatures for changes (Block 204). The system 10 keeps tracking movement of the detected human thermal signature(s) (Block 218) to identify if its direction of movement shifts to one that could be considered a threat—e.g., a bicyclist turns into the travel lane 102 to cross the roadway 104—until the object 108 is no longer in the filed of view of the IR sensor 106. If such movement is detected, the system 10 reassesses the actual threat level (Block 220) and determines if any responsive action is needed, as discussed below.

At this stage, where a human thermal signature has been detected and the system 10 is determining if there is movement of the detected human thermal signature, the system 10 can utilize a dynamic lateral angle acceptance window to prevent any temperature-qualified slow-speed laterally moving objects outside the lateral angle acceptance window from falsely triggering the system 10. That is, the lateral angle acceptance window, in proportionality to the current speed of the vehicle 100 and the speed of the detected human object 108, can eliminate potential threats that are too far away from the side of the roadway 104, or are calculated as to not present a future danger as the vehicle 100 passes by the detected object 108. The angle window is defined from the centerline of the moving vehicle 100—for example, ±45 degrees from the vehicle's centerline. More preferably, the width of the lateral acceptance window can proportionally adjust with the speed of the vehicle 100, such that the window is narrower at lower speeds and wider at higher speeds.

If movement is detected as generally perpendicular to the roadway 104, then at Block 220, the system 10 determines if the movement is moving towards or away from the roadway 104 to assess the threat level to the detected human thermal signature. If the movement is determined to be moving away from the roadway 104, or outside the vehicle's predicted pathway (Block 222), then the threat level is low and is disregarded by the system 10 as it continues to monitor for other qualifying thermal signatures and movements (Block 204). If the movement is determined to be moving towards the roadway 104 in a manner that is calculated to result in a vehicular collision with a pedestrian 108 (Block 224), the system 10 triggers, at Block 226, one or more evasive action responses, including but not limited to activating the vehicle's braking system 116, providing direct input to and activating the vehicle's "Driver Assist" steering system 114, and/or providing visual and audio alerts, such as activating and flashing the vehicle's lights 120 and rhythmically sounding the vehicle's horn 118. Again, if movement is determined to be moving away from the roadway 104 (Block 222), the system 10 can dismiss the detected human thermal signature as being no threat but can keep tracking the movement of the human thermal signature in case the speed and/or direction of movement changes, at which time the threat level can be reassessed.

For more accurate assessment of laterally moving detected human thermal signatures within the lateral acceptance window, an algorithm analyzes the detected human thermal signature's present location, direction of travel, and forward lateral speed relative to the vehicle's present location, travel direction, and forward lateral speed to determine whether the combined travel vectors will result in a collision.

After triggering evasive action responses, as shown in Block 226, the system 10 communicates with the vehicle 100 to return to a normal driving mode and again monitoring for thermal signatures, represented by Block 228, essentially starting the process over again to be on the alert for the next unknown, unexpected, and unpredicted situation.

In operation, as the vehicle speed increases, the braking speed/braking force increases proportionally to be able to properly respond to a threat trigger in an optimized and appropriate manner. As a result, the system 10 dynamically matches the timing of the vehicle's response system and activation thereof by taking into account both the real-time speed of the vehicle and the forward and lateral speed of any detected human thermal signature, as represented in the flowchart illustrated in FIG. 4. For example, if the vehicle 100 is travelling at a high speed, the system 10 triggers responsive actions (such as braking and steering adjustments) more quickly and with faster responsiveness and braking effort than at slower travelling speeds. Similar proactive adjustments to the system's timing of responsive actions and reactive response level thereof can be made in bad weather conditions, such when snow or frozen precipitation are detected by the vehicle's temperature and rain sensors, or in other situations where there is potential for braking/steering impairment. Optimally, these sensor inputs adjust the system's responses to allow for an earlier (and more gentle) initiation of responsive actions so that severe response actions (such as a "panic" immediate stops) on a wet or frozen roadway can be avoided, if possible. That is, if the system 10 is aware of road conditions that would make severe braking responsive actions dangerous, the detection and analysis of potential threats can be automatically modified and/or overridden so that earlier activation and more gradual adjustments to the vehicle's speed and steering are made.

Figure 4:
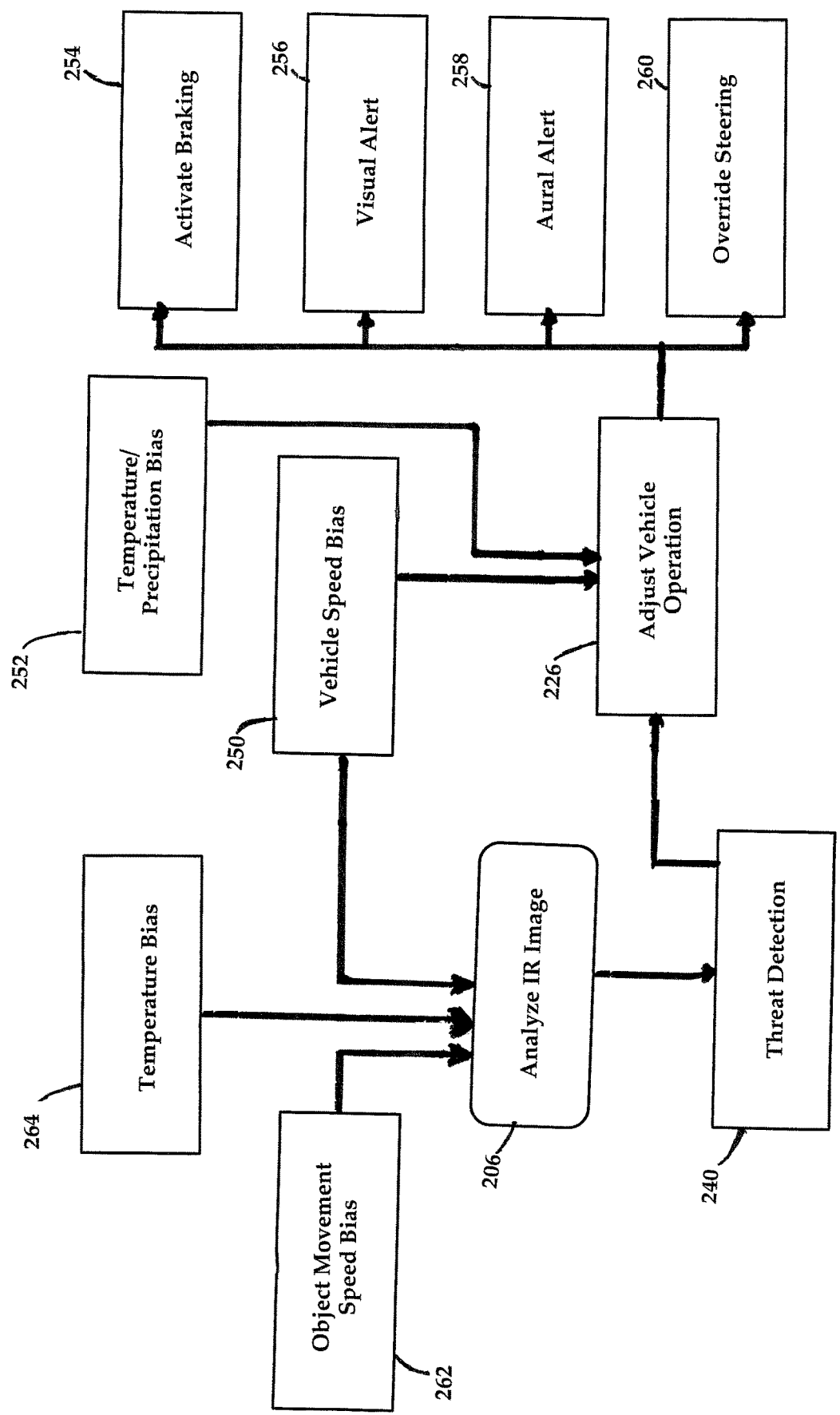
FIG. 4 provides a flowchart generally illustrating another embodiment of a lateral threat detection method in accordance with the present invention.

Referring to FIG. 4, a vehicle speed bias (Block 250), as well as a temperature bias (Block 264) and an object movement speed bias (Block 262), are factored into the step of analyzing the outputs(s) of the IR sensors 106 and motion algorithms, which are already active and searching for and/or detecting qualified targets 108 (Block 206). The threat detection process from FIG. 3, and as described above, is represented in FIG. 4 by Block 240. Where a threat is detected and requires responsive action in operation of the vehicle 100, such adjustment of the vehicle's operation (Block 226) factors in the vehicle speed bias (Block 250) as well as a temperature/precipitation bias (Block 252), which may affect the vehicle's immediate adjustment. As further illustrated in FIG. 4, the adjustment of the vehicle's operation can take the form of one or more of a braking activation (Block 254), a visual alert (Block 256), an aural alert (Block 258) and an override and adjustment of the vehicle's steering (Block 260).

The system 10 of the present invention is designed to be an adjunct to other sensors and guidance systems, especially during times of challenging ambient conditions, and as such would enhance an autonomous vehicle's guidance system.

As noted, optional IR sensors 106R and 106L that are located on each side of the vehicle 100 with a forward-looking bias would aid in enhancing the detection of potential threats on the side of the roadway 104 ahead of the vehicle 100, as illustrated in FIGS. 5-6. That is, the system 10 could identify an object on the side of the upcoming roadway 104, determine if it is moving toward the roadway 104 and at what speed, and assess whether responsive action would be needed by the time the vehicle 100 approaches the detected human thermal signature's anticipated location.

Unlike many optically-based guidance systems that have diminished effectiveness at night, especially in poorly light sections of the roadway 104, the system 10 of the present invention potentially functions even more efficiently at night due to the typically expected greater thermal contrasts between ambient background and detectable targets, especially humans. Optionally, the use of cooling elements for the infra-red imager(s) would further enhance the sensor's temperature discrimination ability.

Figure 7:
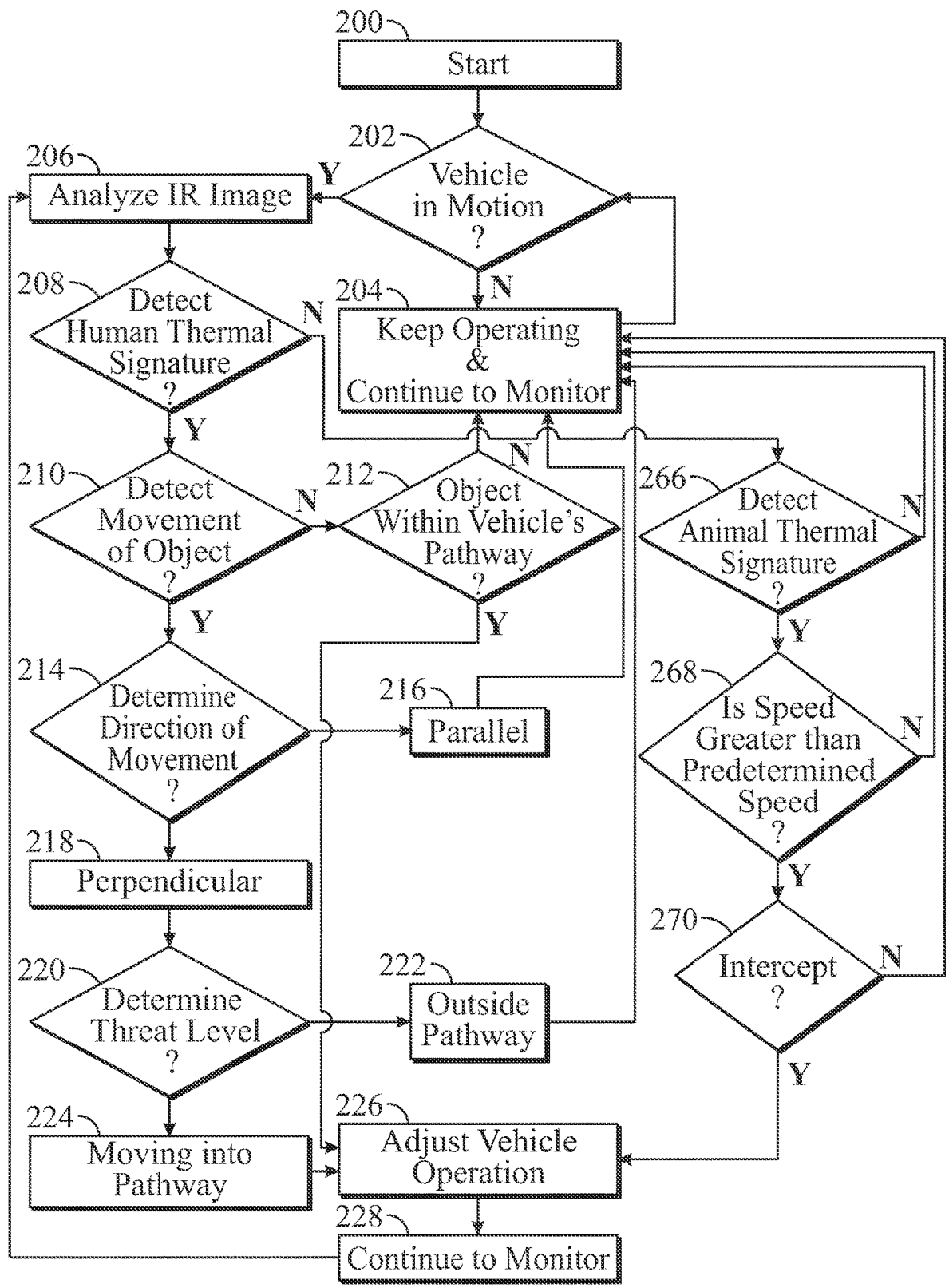
FIG. 7 provides a flow chart generally illustrating an embodiment of a lateral threat detection method in accordance with the present invention.

Referring to FIG. 7, an IR lateral detection process using the system 10 in accordance with the present invention is illustrated. The process shown in FIG. 7 is similar to the lateral threat detection process discussed above in connection with FIG. 3 and, therefore, steps 200 through 228, which are the same as those discussed in connection with FIG. 3, will not be described in detail. In the embodiment shown in FIG. 7, if the determination at Block 208 of determining whether a human thermal profile is detected is no, rather than returning to Block 204 and continuing to monitor, the process proceeds to Block 266 for determining whether an animal thermal signature of an animal (non-pedestrian) is detected. If no animal thermal signature is detected at Block 266, the process proceeds to Block 204 for further operating and monitoring of thermal signatures. Alternatively, if an animal thermal signature is detected, the process proceeds to Block 268 to determine if the vehicle 100 is moving greater than a predetermined speed or velocity. If the vehicle 100 is not moving greater than a predetermined speed or velocity, the process proceeds to Block 204 for further operating and monitoring of thermal signatures. If the vehicle 100 is moving greater than the predetermined speed or velocity, the process proceeds to block 270 to determine a potential intercept solution. If the speed and direction (or velocity) of the encroaching animal (e.g. deer) results in a calculated vector of the animal's estimated future position that is in conflict with the vehicle's 100 estimated future position, then the system proceeds to Block 226 to adjust vehicle operation to avoid contact with the animal. For example, the system may immediately apply the vehicle's brakes and/or override steering of the vehicle in an effort to remove a potential intercept between the vehicle and the animal's path. If the distance from the animal, the animal's heading and/or movement speeds of the vehicle 100 and animal indicate that vehicle 100 will "miss" the animal, then the process proceeds to Block 204 for further operating and monitoring of thermal signatures. The vehicle 100 may optionally activate horn and/or lights to alarm the animal in an effort to prevent the animal from entering the vehicle 100 travel path or remaining in the vehicle 100 travel path.

The thermal gate may be centered about a thermal profile of a specific animal, such as deer, moose, bears, cows, pigs, horses, giraffes, camels, etc. In some embodiments, the thermal gate is configured to detect a plurality of different animal thermal signatures. The thermal gate may be a dynamic thermal gate and/or be configured to detect a thermal signature centered approximately around 104° F., for example, in a range of 103° F. to 105° F. or 99° F. to 109° F., which is indicative of a deer. The thermal gate may be configured based on the species, health, season and breeding fluctuations of the deer. As discussed above, the thermal gate center point and thermal window may be dynamically skewed depending on ambient temperature.

Advantageously, in embodiments according to the present disclosure, a passive infra-red pedestrian and animal vehicle avoidance system may be configured to optimize vehicle safety for autonomous, semi-autonomous and/or non-autonomous vehicles. In some embodiments, the system may be additionally configured and/or optimized for animal behavior which is different than pedestrian behavior. For example, the system may be optimized for detection and avoidance of deer, which may move at higher rates of speed than pedestrians, for example, up to 30 MPH. A system 10 equipped vehicle 100 may be traveling at highway speeds (e.g. 55-70 MPH) and be able to detect and initiate preventative measures for avoiding impact and/or mitigating the potential damage of an impact. Collisions with large and heavy animals at speed can be disastrous for a vehicle's occupant(s). Advantageously, such collisions may be avoided or mitigated in accordance with the present disclosure by being configured to detect, warn and/or avoid specific animals.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A system for identifying an animal danger between a forward moving vehicle and an animal, and for adjusting operation of the vehicle accordingly, the system comprising:
   a thermal sensor array assembly for detecting an animal thermal signature generated by an animal on the side of the roadway or within a predicted pathway of the vehicle on the roadway using passive thermal emission detection;
   an image processor in operative communication with the thermal sensor array assembly for determining if the animal thermal signature is within or moving in a direction toward the predicted forward pathway of the vehicle and assessing the need for responsive action in the vehicle's operation; and
   a central vehicle control system in operative communication with the image process for triggering responsive action in the vehicle's operation if a need for such action is identified;
   wherein the thermal sensor array assembly is configured to detect animal thermal signatures and the image processor is configured to determine if the detected animal thermal signatures are within or moving in a direction toward the predicted forward pathway of the vehicle and to assess the need for responsive action in the vehicle's operation when the vehicle is traveling at a speed in the range of 55-70 mph.

2. The system according to claim 1, wherein the thermal sensor array assembly comprises a passive infra-red thermal sensor.

3. The system according to claim 2, wherein the passive infra-red thermal sensor is configured to provide data through a dynamically variable thermal acceptance window specific to certain animals, such as deer with a nominal center acceptance temperature of 104° F., and wherein any data that meets the thermal acceptance window is passed along to the image processor.

4. The system according to claim 2, wherein the passive infra-red thermal sensor is configured to provide data through a thermal acceptance window with a nominal center acceptance temperature of 104° F., and wherein any data that meets the thermal acceptance window is passed along to the image processor.

5. The system according to claim 1, wherein the image processor filters out any object movement data that has been accepted by the thermal acceptance window that does not exhibit a forward motion with a speed of at least 10 MPH.

6. The system according to claim 1, wherein, upon a calculated determination of a probable interception with an object identified as an animal, the system provides input to the vehicle to automatically apply braking input to the vehicle in order to alter the calculated intercept dynamics to prevent the vehicle having an interception with the animal, and wherein the vehicle is a driven vehicle.

7. The system according to claim 6, wherein the animal is a deer.

8. The system according to claim 1, wherein, upon a calculated determination of a probable interception with an object identified as an animal, the system provides input to the vehicle to automatically apply braking input to the vehicle in order to alter the calculated intercept dynamics to prevent the vehicle having an interception with the animal, and wherein the vehicle is an autonomous vehicle.

9. The system according to claim 8, wherein the animal is a deer.

10. The system according to claim 1, wherein, upon a calculated determination of a probable interception with an object identified as an animal, the system provides input to the vehicle to automatically apply steering input to the vehicle in order to alter the calculated intercept dynamics to prevent the vehicle having an interception with the animal, wherein the vehicle is a driven vehicle.

11. The system according to claim 10, wherein the animal is a deer.

12. The system according to claim 1, wherein, upon a calculated determination of a probable interception with an object identified as an animal, the system provides input to the vehicle to automatically apply steering input to the vehicle in order to alter the calculated intercept dynamics to prevent the vehicle having an interception with the animal, wherein the vehicle is an autonomous vehicle.

13. The system according to claim 12, wherein the animal is a deer.

14. The system according to claim 1, wherein, upon a calculated determination of a probable interception with an object identified as an animal, the system provides input to the vehicle to automatically activate the vehicle's horn and/or headlights in order to alarm the animal and to alter the calculated intercept dynamics to prevent the vehicle having an interception with the animal, and wherein the vehicle is a driven vehicle.

15. The system according to claim 1, wherein, upon a calculated determination of a probable interception with an object identified as an animal, the system provides input to the vehicle to automatically activate the vehicle's horn and/or headlights in order to alarm the animal and to alter the calculated intercept dynamics to prevent the vehicle having an interception with the animal, and wherein the vehicle is an autonomous vehicle.

16. The system according to claim 1, wherein the system is configured to sense or measure a velocity of the vehicle.

17. The system according to claim 1, wherein the system is configured to determine a directional heading of the vehicle.

18. The system according to claim 1, wherein the system is configured to determine a velocity of an object identified as a deer.

19. The system according to claim 1, wherein the system is configured to determine an angular direction of forward motion of an object identified as a deer.

20. The system according to claim 1, wherein the system is configured to sense or measure an ambient temperature and dynamically alter the target temperature center point and acceptance width of a thermal acceptance window indicative of a deer.

21. The system according to claim 1, wherein the image processor is configured to proceed to assess the need for responsive action in the vehicle's operation following a detection of the animal thermal signature only if the image processor determines the vehicle is moving greater than a predetermined speed or velocity.

22. A method for identifying and preventing animal dangers between a forward moving vehicle and an animal, and for adjusting operation of the vehicle accordingly, the method comprising:
   detecting a thermal signature generated by an animal on the side or within the traveled portion of a roadway using passive thermal emission detection;
   determining if the animal thermal signature is within or moving in a direction toward a predicted forward pathway of the vehicle;
   assessing the need for responsive action in the vehicle's operation; and
   triggering responsive action in the vehicle's operation if a need for such action is identified;
   wherein the detecting the thermal signature, the determining if the animal thermal signature is within or moving in a direction toward the predicted forward path of the vehicle and the assessing the need for responsive action in the vehicle's operation occurs when the vehicle is traveling at a speed in the range of 55-70 mph.

23. The method according to claim 22, wherein the assessing the need for responsive action in the vehicle's operation after determining that the vehicle is moving greater than a predetermined speed or velocity.

* * * * *